US011132848B2

(12) United States Patent
Kunkel (10) Patent No.: US 11,132,848 B2
(45) Date of Patent: Sep. 28, 2021

(54) SYSTEM AND METHOD FOR MONITORING A VEHICLE COMPONENT

(71) Applicant: Tenneco Automotive Operating Company Inc., Lake Forest, IL (US)

(72) Inventor: Brian Kunkel, Grass Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 239 days.

(21) Appl. No.: 16/274,819

(22) Filed: Feb. 13, 2019

(65) Prior Publication Data
US 2020/0258321 A1 Aug. 13, 2020

(51) Int. Cl.
G07C 5/00 (2006.01)
G07C 5/08 (2006.01)
H04L 29/08 (2006.01)
G06Q 10/00 (2012.01)
G06Q 30/02 (2012.01)

(52) U.S. Cl.
CPC ............ *G07C 5/008* (2013.01); *G06Q 10/20* (2013.01); *G06Q 30/0226* (2013.01); *G07C 5/006* (2013.01); *G07C 5/0808* (2013.01); *H04L 67/22* (2013.01)

(58) Field of Classification Search
CPC ...... G07C 5/008; G07C 5/0808; G07C 5/006; H04L 67/22; G06Q 10/20; G06Q 30/0226
See application file for complete search history.

(56) References Cited

U.S. PATENT DOCUMENTS

| 6,434,455 | B1 * | 8/2002 | Snow ................. G06F 11/2294 701/31.4 |
| 8,930,067 | B1 * | 1/2015 | Green ................. G06Q 20/102 701/33.2 |
| 9,111,264 | B2 | 8/2015 | Coard |
| 9,245,392 | B2 | 1/2016 | Yang et al. |
| 9,483,881 | B2 | 11/2016 | Comeau et al. |
| 9,520,006 | B1 * | 12/2016 | Sankovsky ............. G07C 5/02 |
| 10,560,823 | B1 * | 2/2020 | Chen ..................... G07C 5/008 |

(Continued)

FOREIGN PATENT DOCUMENTS

| CN | 202120052 | 1/2012 |
| CN | 102736615 | 8/2014 |

*Primary Examiner* — Mary Cheung
(74) *Attorney, Agent, or Firm* — McGarry Bair PC (57) ABSTRACT

A system for monitoring a vehicle component through a mobile device is provided. The mobile device includes an application configured to receive a Vehicle Identification Number (VIN) indicative of a vehicle with which the vehicle component is associated. The application is configured to receive operational data corresponding to the vehicle component based on the Vehicle Identification Number (VIN). The application is configured to evaluate an operational status of the vehicle component based on the operational data. The application is configured to generate a diagnostic code corresponding to the operational status of the vehicle component. The diagnostic code refers to a suggested action in response to the operational status. The application is also configured to track usage of the application by a user after generating the diagnostic code. The application is further configured to generate a reward based on the tracked usage of the application by the user.

20 Claims, 6 Drawing Sheets

(56) References Cited

U.S. PATENT DOCUMENTS

| | | | |
|---|---|---|---|
| 2005/0080606 A1* | 4/2005 | Ampunan | G06Q 10/06 |
| | | | 703/8 |
| 2009/0276115 A1* | 11/2009 | Chen | G07C 5/008 |
| | | | 701/29.6 |
| 2013/0151064 A1* | 6/2013 | Becker | G07C 5/008 |
| | | | 701/31.4 |
| 2014/0277915 A1* | 9/2014 | Bertosa | G07C 5/00 |
| | | | 701/31.4 |
| 2014/0279230 A1* | 9/2014 | Bertosa | G06Q 30/0613 |
| | | | 705/26.41 |
| 2015/0094929 A1* | 4/2015 | Bell | G07C 5/008 |
| | | | 701/99 |
| 2016/0003621 A1* | 1/2016 | Koenig | G06F 3/04845 |
| | | | 701/31.4 |
| 2016/0078403 A1* | 3/2016 | Sethi | G06Q 30/0635 |
| | | | 705/26.81 |
| 2016/0078689 A1* | 3/2016 | Cheng | G07B 15/02 |
| | | | 705/13 |
| 2017/0011561 A1* | 1/2017 | Makke | G07C 5/085 |
| 2017/0294059 A1* | 10/2017 | Noyelle | G07C 5/0808 |
| 2018/0005132 A1* | 1/2018 | Singh | G06N 7/005 |
| 2018/0047107 A1* | 2/2018 | Perl | G06Q 20/10 |
| 2018/0093543 A1 | 4/2018 | Hadi et al. | |

\* cited by examiner

SYSTEM AND METHOD FOR MONITORING A VEHICLE COMPONENT

TECHNICAL FIELD

The present disclosure relates to a system and method for monitoring a vehicle component. More particularly, the present disclosure relates to the system and method for monitoring the vehicle component, such as a vehicle suspension.

BACKGROUND

A vehicle component such as a suspension system is used to maintain a desired vehicle attitude to promote improved stability of a vehicle during motion of the vehicle. Typically, the vehicle traveling over the ground includes the suspension system for filtering or isolating a body of the vehicle from wheels and axles of the vehicle in order to minimize transfer of jerks and vibrations from the wheels to the body. Degradation in performance to the suspension system may occur over time resulting in change in operation of the suspension system.

Often this change may not be easily noticed by an operator of the vehicle. Additionally, delay in servicing or replacing of degraded components of the suspension system may result in irreparable damage to the suspension system, in turn, leading to expensive system replacement costs. Hence, there is a need for a simple and cost-effective system to monitor, detect and provide applicable (Do It Yourself) DIY data to customers and service providers to assist with product maintenance and repair.

U.S. Published Application Number 2016/0078403 describes a system and method for recommending and procuring parts to repair a malfunctioning vehicle. A recommendation and procurement application takes information from a vehicle's on-board diagnostic system and recommends a list of parts required to repair the malfunctioning vehicle. The recommendation and procurement application finds the recommended parts available for purchase via the Internet. The recommendation and procurement application retrieves information on such recommended parts. The recommendation and procurement application also arranges the information in a format most useable to a technician that is to repair the vehicle. The recommendation and procurement application further allows the technician to purchase or otherwise procure such recommended parts to facilitate repair of the malfunctioning vehicle.

Given description covers one or more above mentioned problems and discloses a method and a system to solve the problems.

SUMMARY

In an embodiment of the present disclosure, a system for monitoring a vehicle component through a mobile device is provided. The mobile device has an application configured to be executed on the mobile device. The application is configured to receive a Vehicle Identification Number (VIN) indicative of a vehicle with which the vehicle component is associated. The application is configured to receive operational data corresponding to the vehicle component based on the Vehicle Identification Number (VIN). The application is configured to evaluate an operational status of the vehicle component based on the operational data. The application is configured to generate a diagnostic code corresponding to the operational status of the vehicle component. The diagnostic code refers to a suggested action in response to the operational status. The application is also configured to track usage of the application by a user after generating the diagnostic code. The application is further configured to generate a reward based on the tracked usage of the application by the user.

In another embodiment of the present disclosure, a method for monitoring a vehicle component is illustrated. The method includes receiving, through a mobile device, a Vehicle Identification Number (VIN) indicative of a vehicle with which the vehicle component is associated. The method includes receiving, through the mobile device, operational data corresponding to the vehicle component based on the Vehicle Identification Number (VIN). The method includes evaluating, through an application executed on the mobile device, an operational status of the vehicle component based on the operational data. The method includes generating, through the application, a diagnostic code corresponding to the operational status of the vehicle component. The diagnostic code refers to a suggested action in response to the operational status. The method also includes tracking, through the application, usage of the application by a user after generating the diagnostic code. The method further includes generating, through the application, a reward based on the tracked usage of the application by the user.

Other features and aspects of this disclosure will be apparent from the following description and the accompanying drawings.

DETAILED DESCRIPTION

Figure 1:
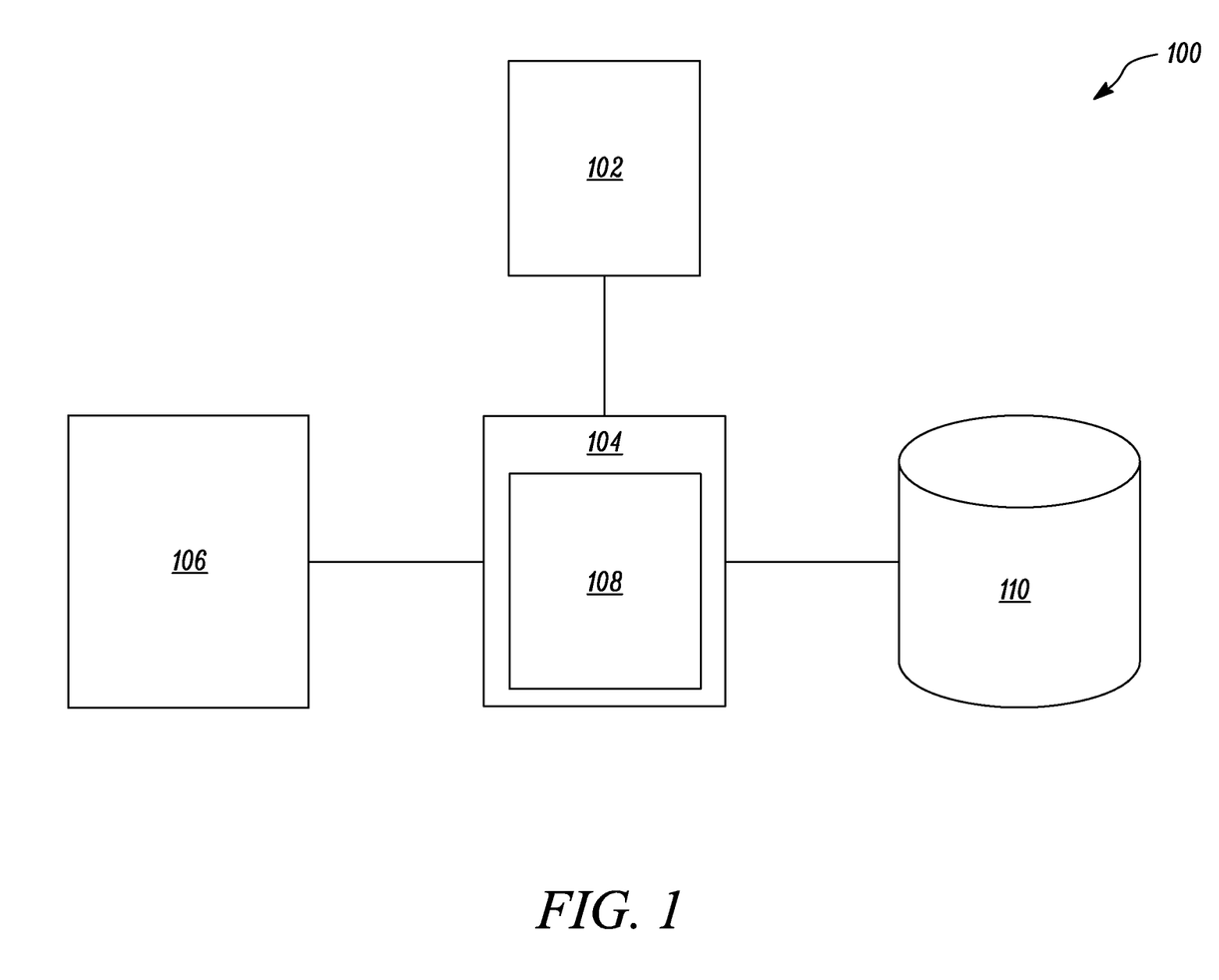
FIG. 1 is an exemplary schematic representation of a system for monitoring a vehicle component, according to an aspect of the present disclosure.

Wherever possible, the same reference numbers will be used throughout the drawings to refer to same or like parts. Referring to FIG. 1, an exemplary schematic representation of a system 100 for monitoring a vehicle component 102 is illustrated. The system 100 includes a mobile device 104. The mobile device 104 may be any electronic mobile equipment, such as a smartphone, a tablet, a laptop computer, a handheld electronic device, and the like. The mobile device 104 provides a user 106 with a digital interface in order to access the system 100.

The system 100 also includes an application 108 provided on the mobile device 104. The application 108 is configured to be executed on the mobile device 104. As such, the application 108 provides the digital interface to the user 106 in order to access the system 100. In some embodiments, the application 108 may be preinstalled on the mobile device 104. In other embodiments, the application 108 may be selectively installed on the mobile device 104 by the user 106 from an external physical source (not shown), such as a disk drive, a Universal Serial Bus (USB) drive, a memory card, and the like. In yet other embodiments, the application 108 may be selectively installed on the mobile device 104 by the user 106 from an external digital source (not shown), such as a website link, an online application store, an online file, and the like.

The system 100 further includes a database 110. The database 110 includes data stored therein associated with the system 100. As such, the mobile device 104 is configured to access the stored data within the database 110 through the application 108. In some embodiments, the database 110 may be stored on a server device (not shown) located external to the mobile device 104. In such a situation, the database 110 may be communicably coupled to the mobile device 104 using a wired or wireless connection, such as an internet connection, a Local Area Network (LAN) connection, and the like. In some embodiments, the database 110 may be stored locally on the mobile device 104 in an internal memory (not shown) of the mobile device 104. In such a situation, the mobile device 104 may directly access the database 110 in order to retrieve the data stored therein.

Figure 2A:
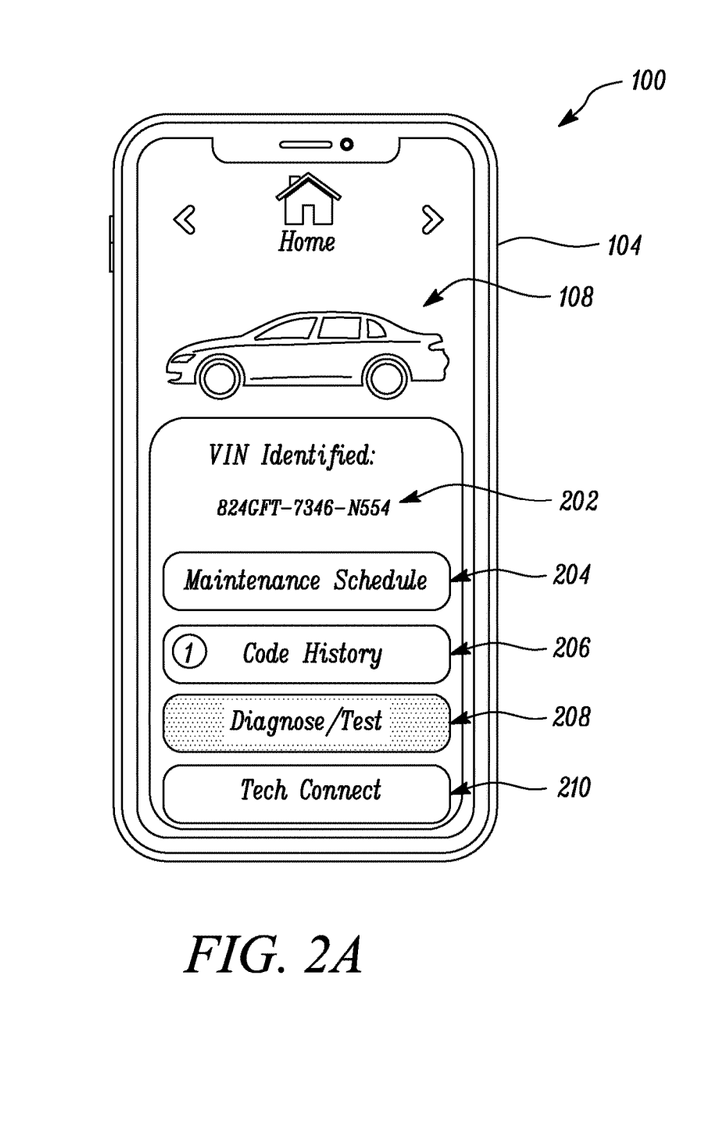
FIGS. 2A to 2H are different exemplary representations of an application associated with the system of FIG. 1, according to an aspect of the present disclosure.

Referring the FIGS. 2A to 2H, different exemplary representations of the application 108 provided on the mobile device 104 are illustrated. Referring to FIG. 2A, the application 108 is configured to receive a Vehicle Identification Number (VIN) 202. The VIN 202 may be an alphabetical, a numerical or an alphanumerical code indicative of a vehicle with which the vehicle component 102 is associated. In one embodiment, the VIN 202 may be selectively entered into the application 108 by the user 106. In such a situation, the user 106 may use an on-screen keyboard (not shown), a physical keyboard (not shown), dictation, voice recognition, and the like, in order to enter the VIN 202 into the application 108. In some embodiments, the application 108 may scan the VIN 202 using a camera device (not shown) provided on the mobile device 104. In some embodiments, the application 108 may scan the VIN 202 from an image (not shown) stored on the mobile device 104 using image/character recognition.

Based on the received VIN 202, the application 108 may communicate with the database 110 in order to identify the vehicle and retrieve vehicle data, such as vehicle model, vehicle manufacturing date, vehicle manufacturer, and the like. Based on the retrieved vehicle data, the application 108 may provide a number of selectable options, such as a maintenance schedule tab 204, a code history tab 206, a diagnose/test tab 208, a tech connect tab 210, and the like. The application 108 may retrieve data related to the selectable options from the database 110.

The maintenance schedule tab 204 may provide maintenance information retrieved from the database 110 related to the vehicle, such as maintenance intervals, maintenance procedure, maintenance checklist, and the like. The code history tab 206 may provide history information related to the vehicle, such as previous diagnosis executed through the application 108, and the like. The diagnose/test tab 208 may provide access to evaluation of one or more vehicle components 102. The tech connect tab 210 may provide access to a number of selectable options, such as a component catalogue 212 (shown in FIG. 2F) showing available components for purchase related to the vehicle, tutorial video content, discussion forums, Frequently Asked Questions (FAQs), and the like. The diagnose/test tab 208 and the tech connect tab 210 will be explained in more detail later.

Figure 2B:
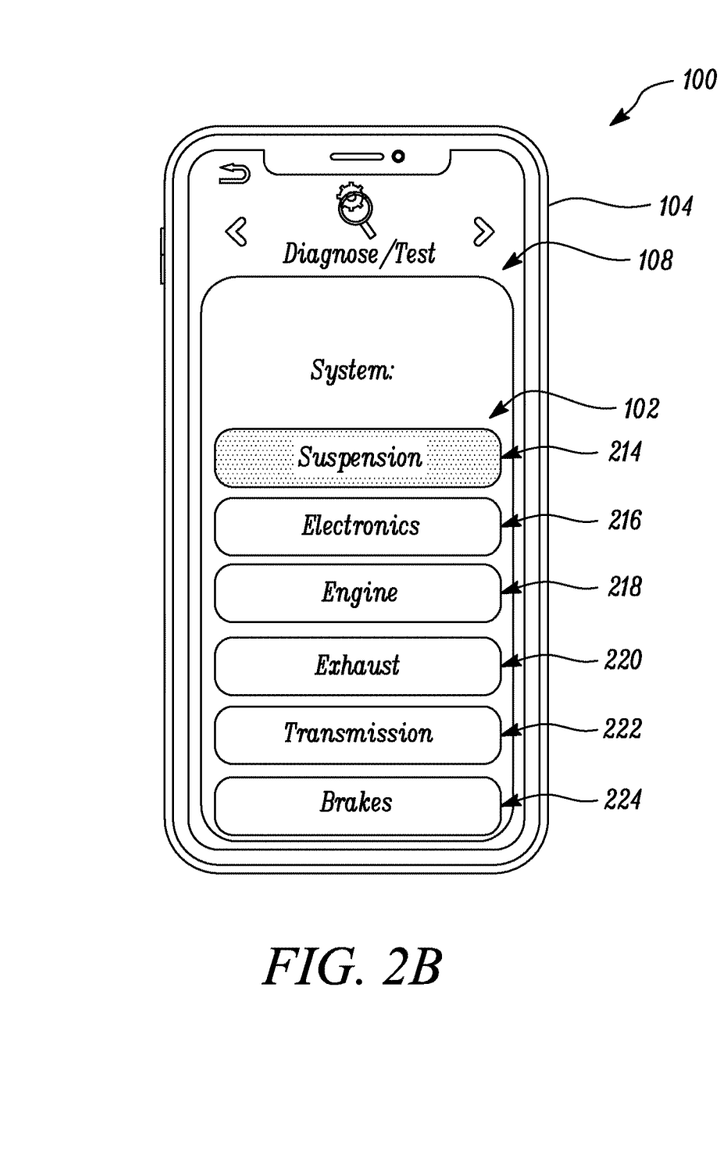

Based on selection of the diagnose/test tab 208 by the user 106, the application 108 is configured to display available vehicle components 102 for the vehicle for performing a diagnosis. Referring to FIG. 2B, in the illustrated embodiment, the application 108 may provide number of selectable options for the available vehicle components 102, such as a suspension tab 214, an electronics tab 216, an engine tab 218, an exhaust tab 220, a transmission tab 222, and a brakes tab 224. It should be noted that the available vehicle components 102 shown in the accompanying figure are merely exemplary and may vary based on application requirements. Based on the requirement, the user 106 may select any of the available vehicle components 102 for performing the diagnosis. The system 100 will now be explained with reference to the suspension 214 as the selected vehicle component 102 for the purpose of clarity.

Figure 2C:
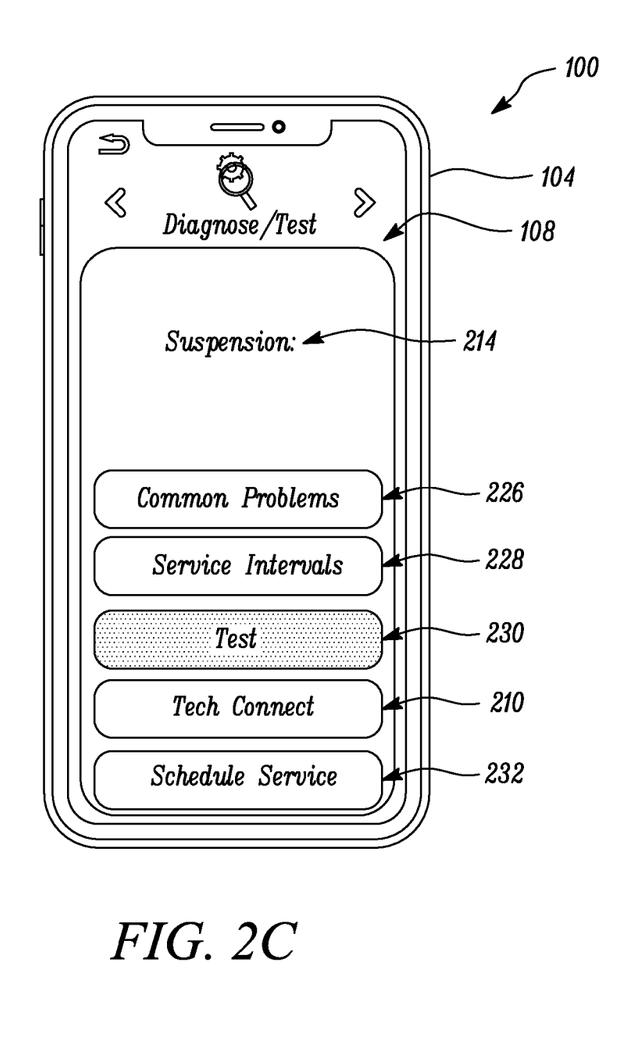

Based on selection of the required vehicle component 102, the suspension 214 in this case, by the user 106, the system 100 may receive an operational data corresponding to the selected vehicle component 102 based on the VIN 202. More specifically, the system 100 may retrieve the operational data from the database 110. Referring to FIG. 2C, in the illustrated embodiment, the system 100 retrieves the operational data related to the suspension 214. The application 108 may provide a number of selectable options for the operational data, such as a common problems tab 226, a service intervals tab 228, a test tab 230, the tech connect tab 210, and a schedule service tab 232.

The common problems tab 226 may provide access to the user 106 to commonly encountered problems and/or their respective solutions related to the suspension 214. The commonly encountered problems/solutions may be provided in the form of FAQs, video and/or audio content, and the like. The service intervals tab 228 may provide access to the user 106 to service intervals, service procedures, and the like, related to the suspension 214. The test tab 230 provides access to the user 106 to perform an evaluation test of the suspension 214. The test tab 230 and the tech connect tab 210 will be explained in more detail later. The schedule service tab 232 may allow the user 106 to schedule a service appointment for the suspension 214 with a service center (not shown). It should be noted that the available selectable options shown in the accompanying figure are merely exemplary and may vary based on application requirements.

Based on selection of the test tab 230 by the user 106, the application 108 provides to evaluate an operational status of the vehicle component 102 based on the operational data. More specifically, in the illustrated embodiment, the application 108 provides to perform the evaluation test of the suspension 214 using the mobile device 104. As such, the evaluation test may determine the operational status of the suspension 214, such as healthy, worn, failure, replacement required, lubrication required, overhauling required, number of miles/kilometers used, remaining life, and the like.

Figure 2D:
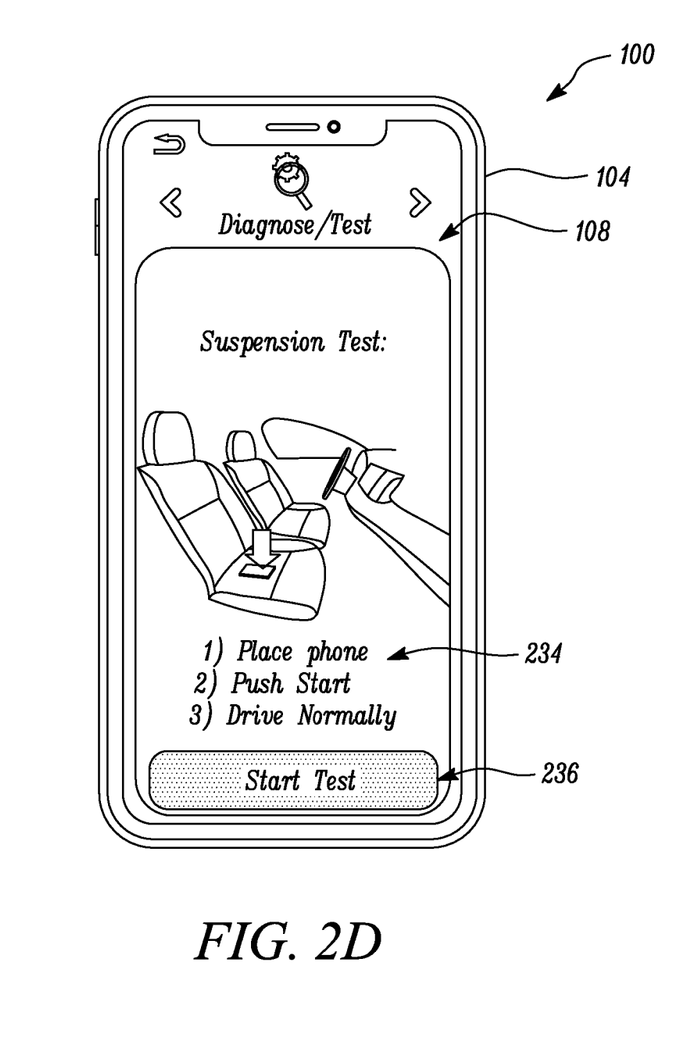

Based on selection of the test tab 230 by the user 106, in the illustrated embodiment, referring to FIG. 2D, the application 108 provides one or more testing instructions 234 to the user 106 through the mobile device 104. In the illustrated embodiment, the testing instructions 234 include placing the mobile device 104 within the vehicle, starting the vehicle, and driving the vehicle for a predefined amount of time/distance, and the like. It should be noted that the testing instructions 234 described herein are merely exemplary and may vary based on application requirements. In such a situation, the application 108 may retrieve data from one or more sensors (not shown), such as an accelerometer, a gyroscope, an inclinometer, and the like, provided on the mobile device 104 in order to derive results of the evaluation test and determine the operational status of the suspension 214. The application 108 may also include a start test tab 236 for the user 106 to select in order to initiate the evaluation test.

Based on the performance of the evaluation test and determination of the operation status of the suspension 214, the application 108 is configured to generate a diagnostic code corresponding to the operational status of the vehicle component 102, the suspension 214 in this case. More specifically, the diagnostic code refers to a suggested action 238 in response to the operational status. The suggested action 238 may include one or more of a service procedure, a replacement, and a replacement procedure of at least a portion of the vehicle component 102, the suspension 214 in this case. As such, the suggested action 238 may be displayed on the mobile device 104 indicating an identified component of the vehicle component 102 that may require servicing, repair, replacement, a procedure to perform the suggested action 238, and the like.

Figure 2E:
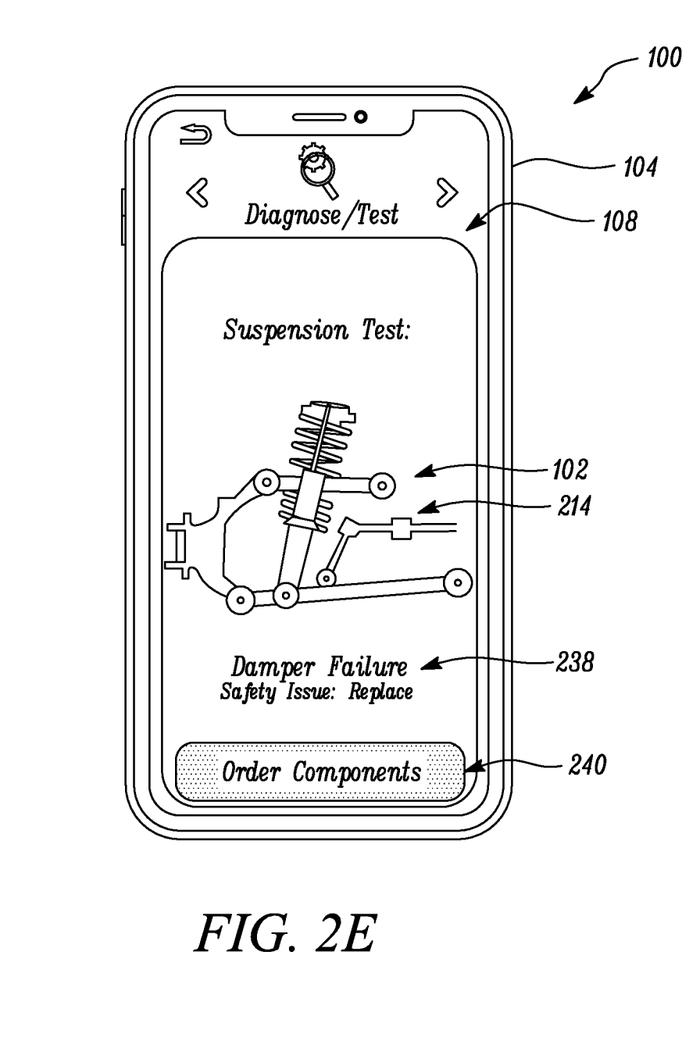

Referring to FIG. 2E, an exemplary scenario of the evaluation test and the operational status of the suspension 214 is illustrated. Based on the evaluation test of the suspension 214, the operation status of the suspension 214 is identified as a failure of a damper of the suspension 214. Accordingly, the suggested action 238 is displayed as a replacement of the damper. The application 108 may also include an order components tab 240 for the user 106 to select in order to purchase the components required to replace the damper. It should be noted that the evaluation test, the operational status, and the suggested action 238 described herein is merely exemplary and may vary based on application requirements.

Figure 2F:
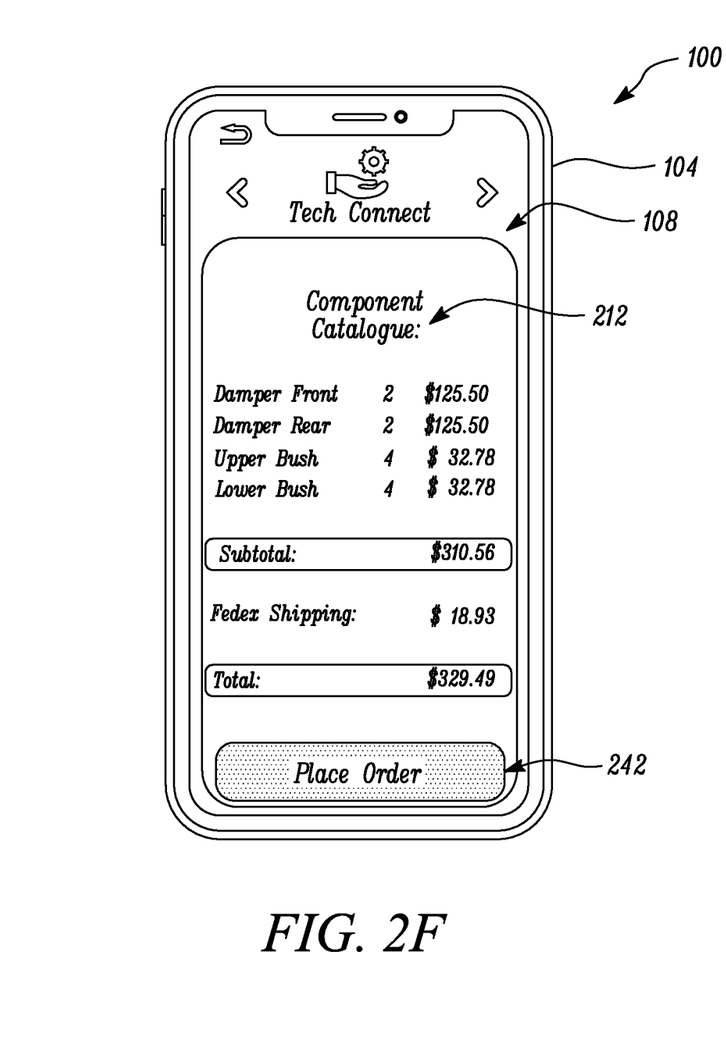

Based on selection of the order components tab 240 by the user 106, referring to FIG. 2F, the application 108 may redirect to the tech connect tab 210. The tech connect tab 210 may display the component catalogue 212 or a list of components required for replacing the identified failed component, the damper in this case, of the suspension 214. Additionally, the application 108 may also display number of units required for each component, cost of each component, sub-total, taxes, shipping charges, handling charges, total cost, and the like. In some embodiments, the component catalogue 212 may include options to add or drop components, modify the number of units, and the like. It should be noted that the components, quantities thereof, costs thereof, and the like, described herein are merely exemplary and may vary based on application requirements. The application 108 may also include a place order tab 242 for the user 106 to select in order to confirm purchase of the displayed components required to replace the damper.

Figure 2G:
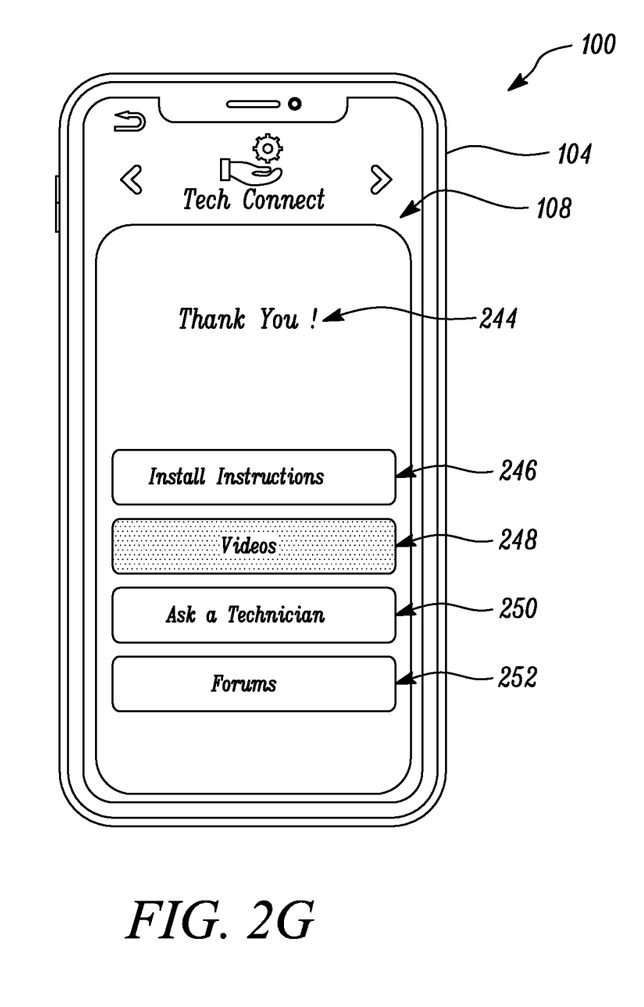

Further, based on selection of the place order tab 242 by the user 106, referring to FIG. 2G, the application 108 may display a purchase confirmation 244. Additionally, the tech connect tab 210 may also include number of selectable options, such as an install instructions tab 246, a videos tab 248, an ask a technician tab 250, a forums tab 252, and the like. The install instruction tab 246 may provide the user 106 access to textual instructions related to installation procedure of the purchased components or any other component available in the component catalogue 212.

The videos tab 248 may provide the user 106 access to one or more instructional videos related to installation procedure, service procedure, repair procedure, and/or replacement procedure of the purchased components or any other component available in the component catalogue 212. The ask a technician tab 250 may provide the user 106 access to real time discussion, chat, and/or call with a service personnel. The forums tab 252 may provide the user 106 access to one or more forums and/or discussion threads. The forums/discussion threads may include reviews, comments, known issues, solutions, installation procedures, Do It Yourself (DIY) procedures, FAQs, and the like, posted by other users or service personnel.

Figure 2H:
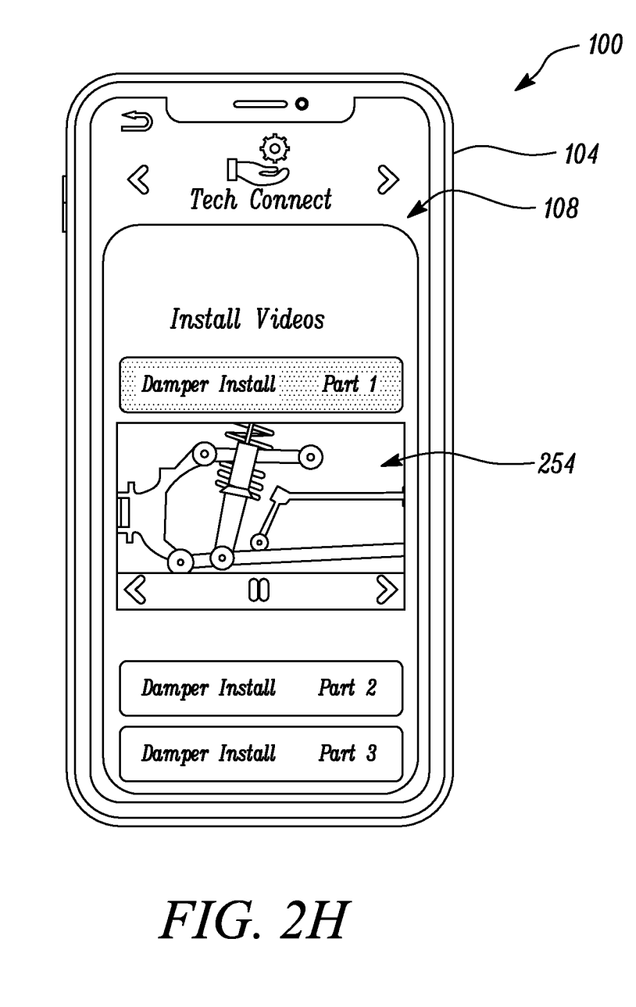

Based on selection of the videos tab 248 by the user 106, referring to FIG. 2H, the application 108 is configured to display video content 254 related to the purchased components or any other component available in the component catalogue 212. Additionally, the application 108 is configured to track usage of the application 108 by the user 106 after generating the diagnostic code as described with reference to FIG. 2E. The usage of the application 108 by the user 106 may be measured in number of ways, such as an amount of time spent watching the video content 254 and/or accessing the forums, a quantity of video content 254 accessed, a number of forums accessed, and the like.

Based on the tracked usage of the application 108, the application 108 is configured to generate a reward (not shown). In one embodiment, the reward may be a financial reward. The financial reward may be directly proportional to the usage of the application 108 by the user 106. The financial reward may include one or more of monetary discounts, cashbacks, redeemable reward points/coins, and the like, on purchase of the components through the application 108. In other embodiment, the reward may include free gifts or components on purchase of a predefined number of components through the application 108, and the like.

Figure 3:
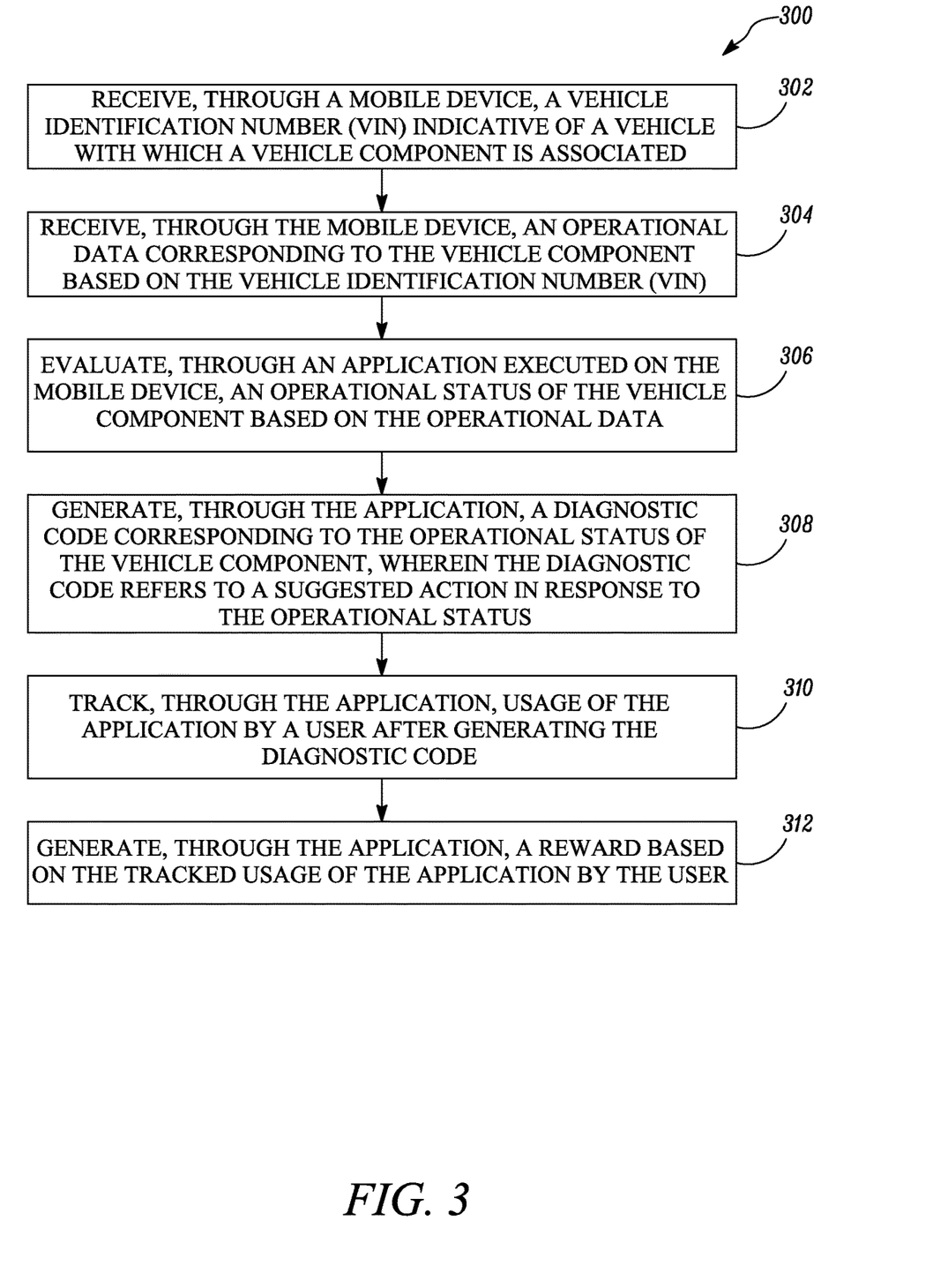
FIG. 3 is a flowchart of a method for monitoring the vehicle component of FIG. 1, according to an aspect of the present disclosure.

The present disclosure also relates to a method 300 for monitoring the vehicle component 102. Referring to FIG. 3, a flowchart of the method 300 of working of the system 100 is illustrated. At step 302, the application 108 receives, through the mobile device 104, the VIN 202 indicative of the vehicle with which the vehicle component 102 is associated as described with reference to FIG. 2A. Based on the received VIN 202, the application 108 provides number of selectable options for the available vehicle components 102 as described with reference to FIG. 2B. At step 304, the application 108 receives, through the mobile device 104, the operational data corresponding to the vehicle component 102 based on the VIN 202 and the selected option as described with reference to FIG. 2C.

At step 306, the operational status of the vehicle component 102 is evaluated, through the application 108, based on the operational data as described with reference to FIG. 2E. More specifically, prior to the evaluation of the operational status, the application 108 provides a selectable test tab 230 as described with reference to FIG. 2C and number of testing instructions 234 as described with reference to FIG. 2D. At step 308, the application 108 generates the diagnostic code corresponding to the operational status of the vehicle component 102. The diagnostic code refers to the suggested action 238 in response to the operational status. The suggested action 238 includes one or more of the service procedure, the replacement, and the replacement procedure of the portion of the vehicle component 102 as described with reference to FIG. 2E.

Based on the suggested action 238, the application 108 provides the component catalogue 212 corresponding to the diagnostic code as described with reference to FIG. 2F. The component catalogue 212 allows the user 106 to selectively purchase one or more displayed components for service and/or repair of the vehicle component 102. At step 310, the application 108 tracks the usage of the application 108 by the user 106 after generating the diagnostic code. The usage of the application 108 by the user 106 may be measured in number of ways, such as the amount of time spent watching the video content 254 and/or accessing the forums, the quantity of video content 254 accessed, the number of forums accessed, and the like.

At step 312, the application 108 generates the reward based on the tracked usage of the application 108 by the user 106. In one embodiment, the reward may be the financial reward. The financial reward may be directly proportional to the usage of the application 108 by the user 106. The financial reward may include one or more of monetary discounts, cashbacks, redeemable reward points/coins, and the like, on purchase of the components through the application 108. In other embodiment, the reward may include free gifts or components on purchase of the predefined number of components through the application 108, and the like.

The system 100 provides a simple, effective, and convenient digital platform for automotive manufactures, aftermarket component manufacturers, and/or Original Equipment Manufacturers (OEMs) to collect and provide relevant DIY data to customers and service providers. As such, the system 100 may allow manufacturers to assist the customers and service providers with product maintenance and repair, diagnosing component performance/issues, and recommend optimal replacement parts.

The system 100 may also be configured to inform manufacturers of repair rates and identify vehicles and/or components that may experience high failure rates. Accordingly, the system 100 may enable manufacturers to improve inventory control, perform detailed investigation/analysis related to the problem and/or solution to issues in components, collect/analyze repair data from vehicles, decide and perform recall actions, build vehicle information database, and the like. The system 100 may provide improved component sales, improved aftersales support, reduced wait times at service centers, reduce dependency on service centers/personnel, and reduced operating/maintenance costs to the user 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for monitoring a vehicle component through a mobile device, the mobile device having one or more sensors and a mobile application configured to be executed on the mobile device, the application configured to:
   receive a Vehicle Identification Number (VIN) indicative of a vehicle with which the vehicle component is associated;
   receive operational vehicle data corresponding to the vehicle component based on the Vehicle Identification Number (VIN);
   receive a selection by a user to perform a diagnostic test on the vehicle component;
   instruct a user via the mobile application to perform a test of the vehicle component;
   sense the vehicle component using the one or more sensors on the mobile device;
   collect operational data on the mobile device of the vehicle component based on the sensing by the sensors during the test;
   evaluate an operational status of the vehicle component based on the operational data collected on the mobile device;
   generate a diagnostic code corresponding to the operational status of the vehicle component, wherein the diagnostic code refers to a suggested action in response to the operational status;
   track usage of the mobile application by a user after generating the diagnostic code; and
   generate a reward based on the tracked usage of the mobile application by the user.

2. The system of claim 1, wherein the Vehicle Identification Number (VIN) is received through at least one of inputting of the Vehicle Identification Number (VIN) into the application and scanning of the Vehicle Identification Number (VIN) by the mobile application.

3. The system of claim 1 further includes providing at least a testing instruction to the user through the mobile device.

4. The system of claim 3, wherein the at least a testing instruction comprises placing the mobile device in the vehicle, starting the vehicle and driving the vehicle for a predetermined amount or time or distance.

5. The system of claim 1, wherein the vehicle component is a vehicle suspension.

6. The system of claim 1, wherein the suggested action includes at least one of a service procedure, a replacement, and a replacement procedure of at least a portion of the vehicle component.

7. The system of claim 1, wherein the reward is a financial reward.

8. The system of claim 7, wherein an amount of the financial reward is directly proportional to usage of the application by the user.

9. The system of claim 1 further includes providing a component catalogue corresponding to the diagnostic code.

10. The system of claim 1 further includes allowing access to video content corresponding to the diagnostic code.

11. The system of claim 10, wherein usage of the application is measured through an amount of time spent watching the video content.

12. The system of claim 1 further includes allowing access to a forum corresponding to the diagnostic code.

13. The system of claim 1 further includes allowing access to known issues associated with the vehicle component.

14. A method for monitoring a vehicle component, the method comprising:
   receiving, through a mobile device having one or more sensors and a mobile application, a Vehicle Identification Number (VIN) indicative of a vehicle with which the vehicle component is associated;
   receiving, through the mobile device, operational vehicle data corresponding to the vehicle component based on the Vehicle Identification Number (VIN);
   receiving a selection by a user to perform a diagnostic test on the vehicle component;
   instructing a user via the mobile application to perform a test of the vehicle component;
   sensing the vehicle component using the one or more sensors on the mobile device;
   collecting operational data on the mobile device of the vehicle component based on the sensing by the sensors during the test;

evaluating, through the mobile application, an operational status of the vehicle component based on the operational data;

generating, through the mobile application, a diagnostic code corresponding to the operational status of the vehicle component, wherein the diagnostic code refers to a suggested action in response to the operational status;

tracking, through the mobile application, usage of the application by a user after generating the diagnostic code; and generating, through the mobile application, a reward based on the tracked usage of the application by the user.

15. The method of claim 14 further includes providing at least a testing instruction to the user through the mobile device.

16. The system of claim 15, wherein the at least a testing instruction comprises placing the mobile device in the vehicle, starting the vehicle and driving the vehicle for a predetermined amount or time or distance.

17. The method of claim 14, wherein the suggested action includes at least one of a service procedure, a replacement, and a replacement procedure of at least a portion of the vehicle component.

18. The method of claim 14, wherein the reward is a financial reward.

19. The method of claim 18, wherein an amount of the financial reward is directly proportional to usage of the application by the user.

20. The method of claim 14 further includes providing a component catalogue corresponding to the diagnostic code.

* * * * *